United States Patent [19]
Kawano et al.

[11] Patent Number: 5,651,239
[45] Date of Patent: Jul. 29, 1997

[54] SEALING DEVICE FOR PACKAGING MATERIAL TUBE

[75] Inventors: Takafumi Kawano; Michio Ueda, both of Tokushima, Japan

[73] Assignee: Shikoku Kakoki Co., Ltd., Itano-gun, Japan

[21] Appl. No.: 616,008

[22] Filed: Mar. 14, 1996

[30] Foreign Application Priority Data

Mar. 16, 1995 [JP] Japan ..................... 7-057171

[51] Int. Cl.[6] ...................................... B65B 9/06
[52] U.S. Cl. .................. 53/550; 53/373.7; 219/633; 219/659
[58] Field of Search ............... 53/550, 551, 552, 53/450, 451, 373.7, DIG. 2; 156/380.2, 380.6, 379.7; 219/633, 659

[56] References Cited

U.S. PATENT DOCUMENTS

| 4,163,885 | 8/1979 | Kobetsky | 150/380.6 |
|---|---|---|---|
| 4,371,768 | 2/1983 | Pozna | 219/633 |
| 4,637,199 | 1/1987 | Steck et al. | 53/551 |
| 5,025,123 | 6/1991 | Pfaffmann et al. | 156/380.2 |
| 5,031,380 | 7/1991 | Ueda | 53/552 |
| 5,109,653 | 5/1992 | Kubis et al. | 53/DIG. 2 |
| 5,123,989 | 6/1992 | Horiishi et al. | 219/633 |

FOREIGN PATENT DOCUMENTS 6193011  12/1984  Japan .

*Primary Examiner*—John Sipos
*Assistant Examiner*—Gene L. Kim
*Attorney, Agent, or Firm*—Armstrong, Westerman, Hattori, McLeland & Naughton

[57] ABSTRACT

A sealing device for a packaging material tube has a pair of pressure arms 13 supported by a lift frame 11 each at a lower portion thereof and pivotally movable about respective parallel horizontal axes. A pair of sealing jaws 14 are fixed to the respective pressure arms 13 each at an upper portion of the arm so as to be opposed to each other. A high-frequency heating coil 18 is provided on one of the sealing jaws 14 for induction-heating an aluminum foil layer of the tube T present between the sealing jaws 14 as closed. A transmission-side primary coil 21 is fixedly disposed at one side of the path of vertical movement of the lift frame 11. A receiving-side secondary coil 22 is so disposed as to form a closed electric circuit along with the heating coil 18. The primary coil 21 and the secondary coil 22 are electromagnetically connected when the sealing jaws 14 are closed, and are electromagnetically separated when the jaws 14 are opened.

7 Claims, 6 Drawing Sheets

SEALING DEVICE FOR PACKAGING MATERIAL TUBE

BACKGROUND OF THE INVENTION

The present invention relates to a sealing device, for example, for a vertical packaging material tube filled with a beverage for sealing the tube transversely thereof when the tube is to be divided into lengths each corresponding to one container to form pillowlike intermediate containers.

As disclosed, for example, in JP-A-61-93011, such a device already known comprises a lift frame, a pair of pressure arms supported by the lift frame each at a lower portion thereof and pivotally movable about respective parallel horizontal axes, a pair of sealing jaws opposed to each other and fixed to the respective pressure arms each at an upper portion of the arm, drive means for pivotally moving the arms to close the sealing jaws when the lift frame is lowered and to open the sealing jaws when the lift frame is raised, a high-frequency heating coil provided on one of the sealing jaws for induction-heating an aluminum foil layer of a tube present between the sealing jaws as closed, and a flexible feeder line connecting the heating coil to a power source.

With the device described, current is supplied to the heating coil through the feeder line, which is repeatedly bent with the up-and-down movement of the lift frame and the pivotal movement of the pressure arms. Accordingly, the feeder line is relatively short in mechanical life, requires frequent periodic inspection and periodic replacement and therefore has the problem of being cumbersome to maintain.

SUMMARY OF THE INVENTION

An object of the present invention is to overcome the above problem and to provide a sealing device for packaging material tubes which is easy to maintain.

The present invention provides a sealing device for a packaging material tube of laminate having an aluminum foil layer which device is adapted to seal the tube transversely thereof and comprises a lift frame, a pair of pressure arms supported by the lift frame each at a lower portion thereof and pivotally movable about respective parallel horizontal axes, a pair of sealing jaws opposed to each other and fixed to the respective pressure arms each at an upper portion of the arm, drive means for pivotally moving the arms to close the sealing jaws when the lift frame is lowered and to open the sealing jaws when the lift frame is raised, and a high-frequency heating coil provided on one of the sealing jaws for induction-heating the aluminum foil layer of the tube present between the sealing jaws as closed, the sealing device being characterized in that the device has a transmission-side primary coil fixedly disposed at one side of the path of vertical movement of the lift frame and a receiving-side secondary coil so provided as to form a closed electric circuit along with the heating coil, the primary coil and the secondary coil being electromagnetically connected when the sealing jaws are closed, the primary coil and the secondary coil being electromagnetically separated when the jaws are opened.

According to the invention, current is supplied to the heating coil via the primary coil and the secondary coil, so that electromagnetic induction is effected contactlessly between these coils. This gives a relatively long mechanical life to the primary and secondary coils and therefore obviates the need for frequent periodic inspection and periodic replacement of the device to ensure facilitated maintenance.

Preferably, the primary coil has a horizontal helical portion extending in a direction orthogonal to the axis about which the pressure arm is pivotally movable, and the secondary coil has a pair of straight portions vertically extending respectively at opposite sides of the axis of the helical portion, the straight portions being movable toward and away from an end of the helical portion with the pivotal movement of the pressure arms. The primary coil and the secondary coil are then electromagnetically connected or separated by the pivotal movement of the pressure arms and can therefore be so connected or separated reliably.

Further preferably, the helical portion has a fixed core, and the straight portions are provided with a movable core movable with the straight portions, the fixed core and the movable core being united when the sealing jaws are closed to form a closed magnetic circuit extending inside the helical portion and then between the straight portions. The fixed core and the movable core then efficiently effect electromagnetic induction between the primary and secondary coils, consequently reducing the power loss involved and enabling the heating coil to effectively heat the portion of the tube to be sealed.

The fixed core may be approximately E-shaped when seen from above and comprise a leg having the helical portion fitted therearound, a pair of outer legs extending in parallel to each other respectively at opposite sides of the leg, and a yoke connecting corresponding ends of the leg and the outer legs. The movable core then comprises bars extending along the respective straight portions and is fixed to the straight portions.

Alternatively, each of the fixed core and the movable core may be approximately E-shaped when seen from above and have its opening portions opposed to those of the other.

Further alternatively, the fixed core may be approximately C-shaped when seen from above, the movable core being in the form of a bar.

Preferably, the primary coil and the fixed core are then arranged at each of upper and lower two levels.

DESCRIPTION OF THE PREFERRED EMBODIMENTS

Embodiments of the invention will be described below with reference to the drawings.

In the following description, the term "front" refers to the side toward the direction of arrow A in FIG. 1, the term "rear" to the opposite side, and the terms "right" and "left" are used as the device is seen from the front.

The illustrated tube T serving as a packaging material is made of a laminate which, although not illustrated, comprises a polyethylene layer, paper layer, polyethylene layer, aluminum foil layer and polyethylene layer which are arranged in this order from the outer side inward. The tube T is filled with a beverage.

Figure 1:
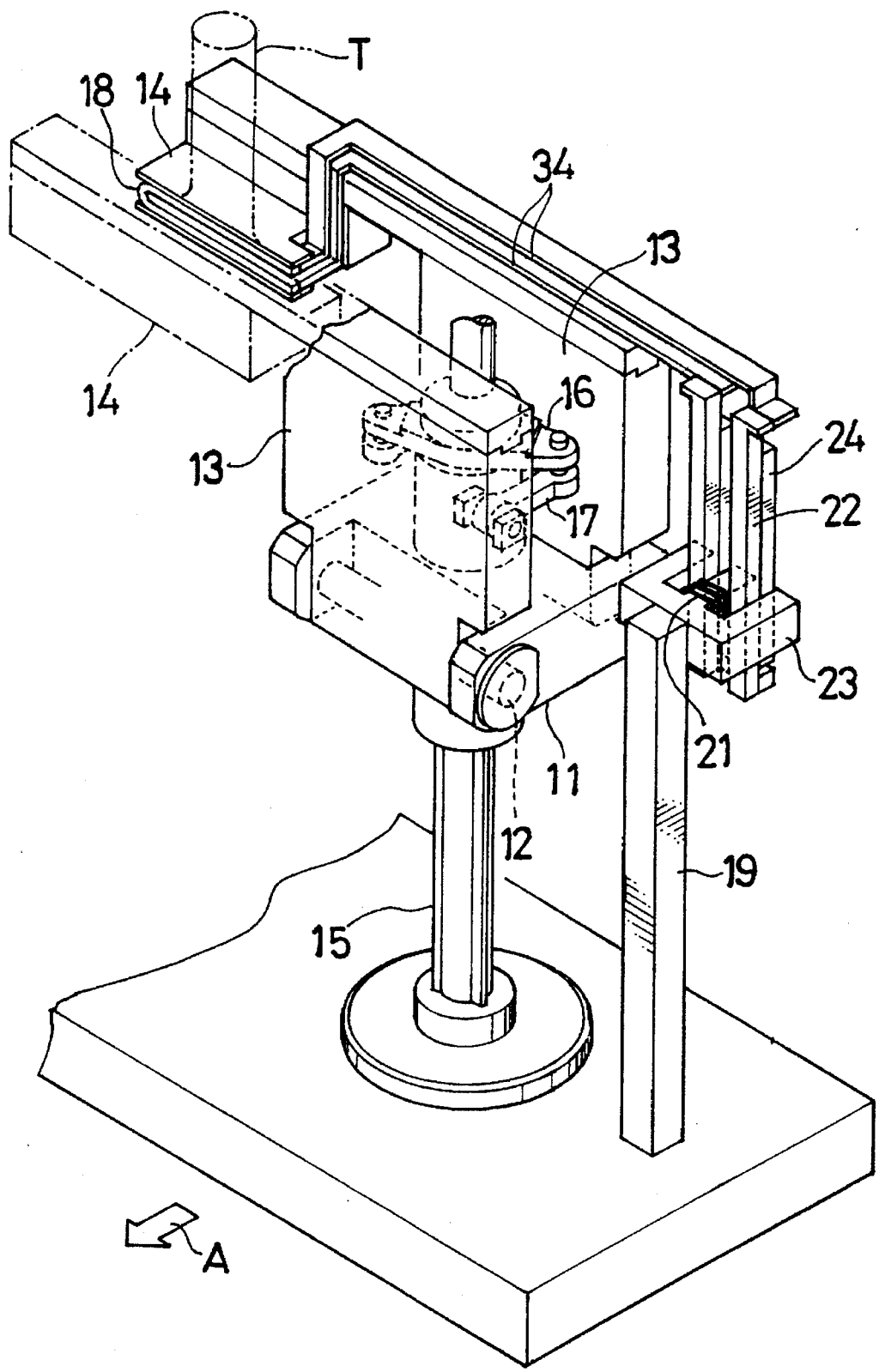
FIG. 1 is a perspective view of a sealing device embodying the invention.

With reference to FIG. 1 showing a sealing device, the device comprises a lift frame 11, a pair of front and rear pressure arms 13 movably supported respectively by a pair of front and rear horizontal pivots 12, and a pair of front and rear sealing jaws 14 opposed to each other and fixed to and projecting from the respective pressure arms 13 each at an upper portion of the arm.

A vertical drive rod 15 extends through the lift frame 11 and between the pressure arms 13. The lift frame 11 is coupled to the drive rod 15 so as to be movable with the drive rod 15 upward and downward while permitting the rod 15 to rotate reversibly. A winglike horizontal rotary member 16 is fixed to the drive rod 15. Opposite ends of the rotary member 16 are linked to the pressure arms 13 by a pair of connecting rods 17, respectively.

The drive rod 15 is driven by unillustrated means for upward and downward movements and reversible rotation, whereby the sealing jaws 14 are closed when the lift frame 11 is lowered, and are opened when the lift frame 11 is raised. Unillustrated pressing means produces a sealing pressure between the sealing jaws 14 as closed.

When the tube T is sealed in the form of a bar, the tube is cut transversely thereof at the center of width of the seal portion at the same time by an unillustrated cutter provided on the front sealing jaw 14. The rear sealing jaw 14 is provided with a U-shaped high-frequency heating coil 18 with an open right end directed sidewise.

Disposed upright at the right of the path of vertical movement of the lift frame 11 is a post 19 carrying a transmission-side primary coil 21 attached to its upper end. A receiving-side secondary coil 22 is disposed in the rear of the primary coil 21. The primary coil 21 is provided with a fixed core 23, and the secondary coil 22 with a movable core 24.

Figure 3:
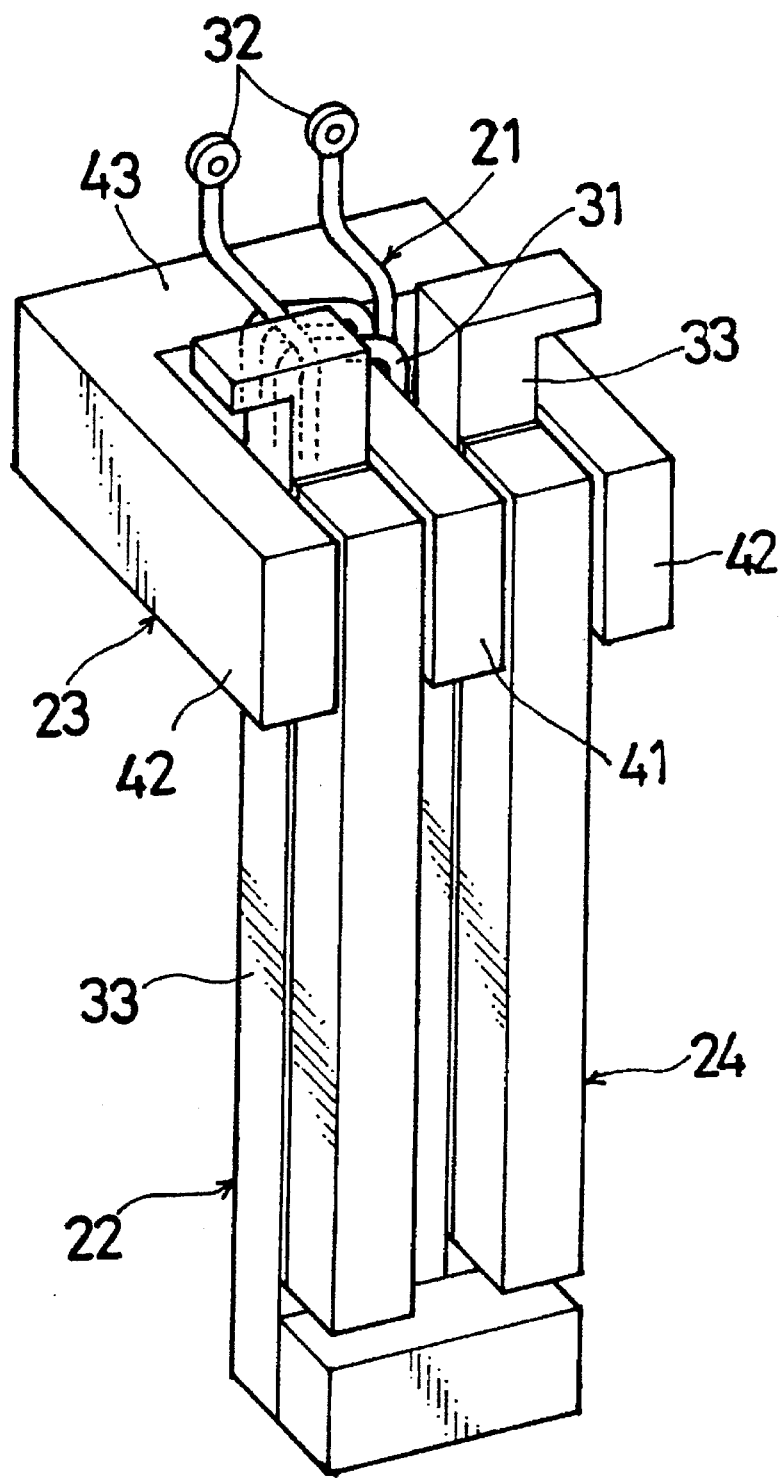
FIG. 3 is a fragmentary perspective view of the device showing a primary coil, secondary coil and parts around these coils.

With reference to FIG. 3, the primary coil 21 has a horizontal helical portion 31 comprising about three turns of wire and extending in the front-to-rear direction. Opposite ends of the helical portion 31 are provided with respective terminals 32 for connection to an unillustrated a.c. power source. The secondary coil 22 is U-shaped and has a pair of straight portions 33 extending vertically in parallel to each other respectively at the right and left sides of the axis of the helical portion 31. The upper ends of the straight portions 33 are connected to opposite ends of the heating coil 18 by a pair of connecting coils 34, respectively (FIG. 1). Thus, a closed electric circuit is formed by the secondary coil 22, connecting coils 34 and heating coil 18.

Figure 4:
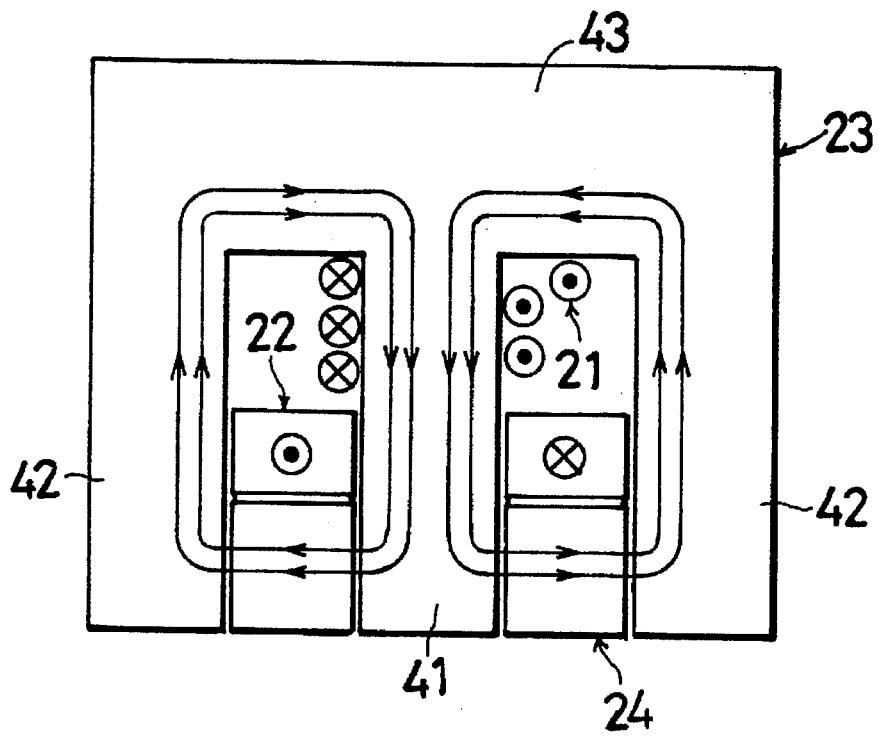
FIG. 4 is a diagram for illustrating electromagnetic induction of the primary and secondary coils.

The fixed core 23 and the movable core 24 are united into a three-leg core as seen in FIG. 4 and are each prepared from ferrite.

The fixed core 23 is approximately E-shaped when seen from above and comprises a horizontal leg 41 having the helical portion 31 fitted therearound, a pair of outer legs 42 extending in parallel to each other respectively at opposite sides of the leg 41, and a yoke 43 connecting the front ends of the leg 41 and the outer legs 42. The movable core 24 comprises bars of rectangular cross section extending along the respective straight portions 33 and is fixed to the rear faces of the straight portions 33.

The secondary coil 22 is moved with the movable core 24 upward, downward and pivotally with the upward and downward movements of the lift frame 11 and the pivotal movement of the pressure arms 13.

FIG. 1 shows the lift frame 11 at the upper limit of its vertical stroke with the sealing jaws 14 closed. In this state, the straight portions 33 of the seconary coil 22 and the movable core 24 are positioned in the spaces between the leg 41 of the fixed core 23 and the outer legs 42 thereof as shown in detail in FIG. 4. In this state, the primary coil 21 and the secondary coil 22 are interlinked. On the other hand, the movable core 24 forms another yoke of the three-leg core. The primary and secondary coils 21 and 22 are held interlinked until the lift frame 11 reaches the lower limit of its vertical stroke like the state shown in FIG. 3.

Figure 2:
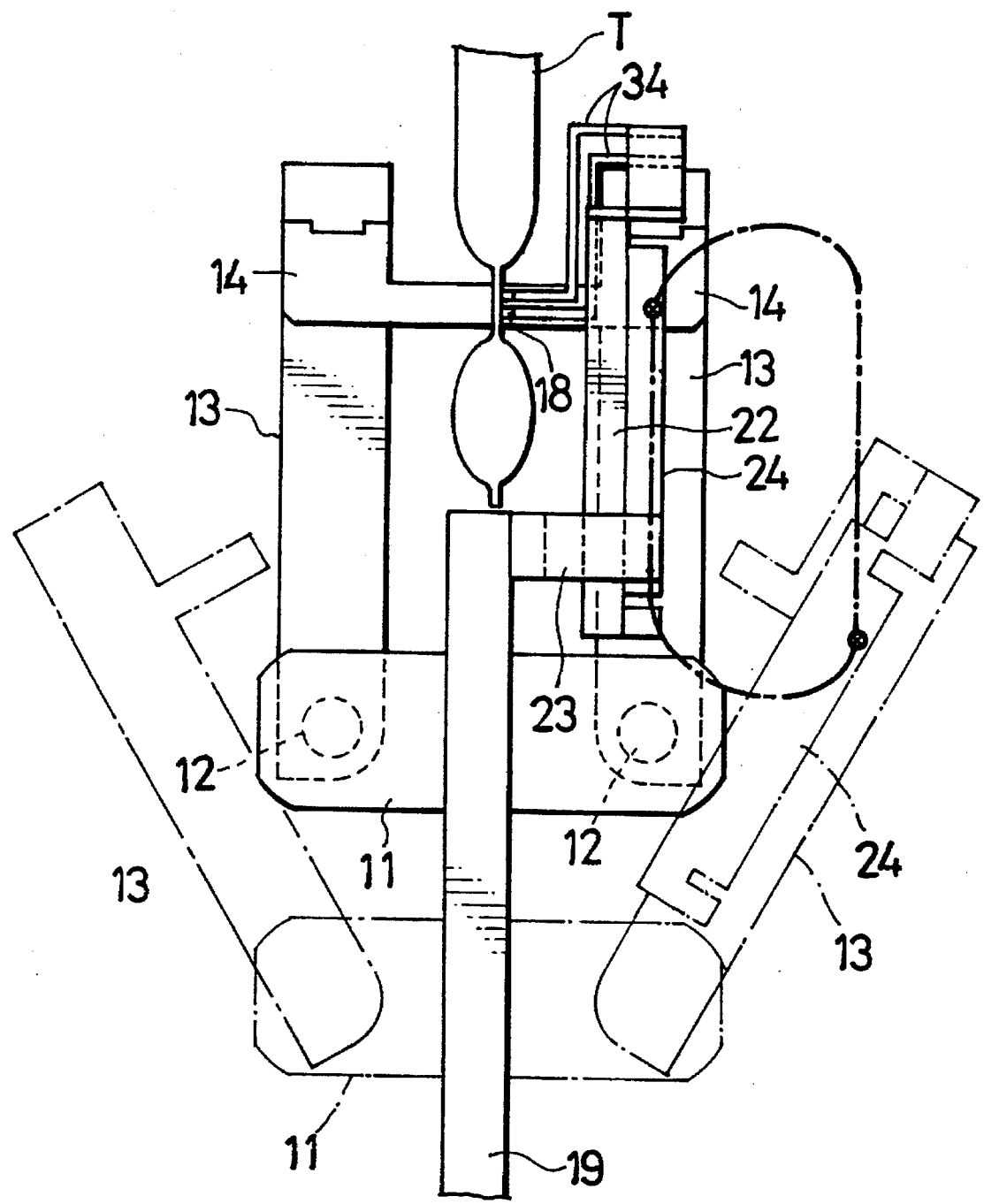
FIG. 2 is a diagram for illustrating the operation of the device.

After the lift frame 11 has been brought to the lower limit, the pressure arms 13 are pivotally moved to open the sealing jaws 14 as shown in FIG. 2. As a result, the secondary coil 22 is pivotally moved away from the primary coil 21 with this movement, whereby the primary and secondary coils 21 and 22 are freed from the interlinked state.

When a high-frequency current is passed through the primary coil 21 while the primary and secondary coils 21 and 22 are interlinked, an electromotive force is induced in the secondary coil 22 by the resulting magnetic field. When the current is passed through the helical portion 31 perpendicular to the plane of FIG. 4 so that the direction of the current is upward at the right side of the helical portion 31 and downward at the left side of the portion 31, a current flows through the secondary coil 22, i.e., downward through the right straight portion 33 and upward through the left straight portion 33, so that the magnetic field of the secondary coil 22 offsets that of the primary coil 21.

While the magnitude of the electromotive force induced in the secondary coil 22 is governed by the magnitude of the magnetic field passing between the two straight portions 33, the magnetic field is effectively guided in between the two straight portions 33 because the fixed core 23 and the movable core 24 are united into a three-leg core.

Figure 7:
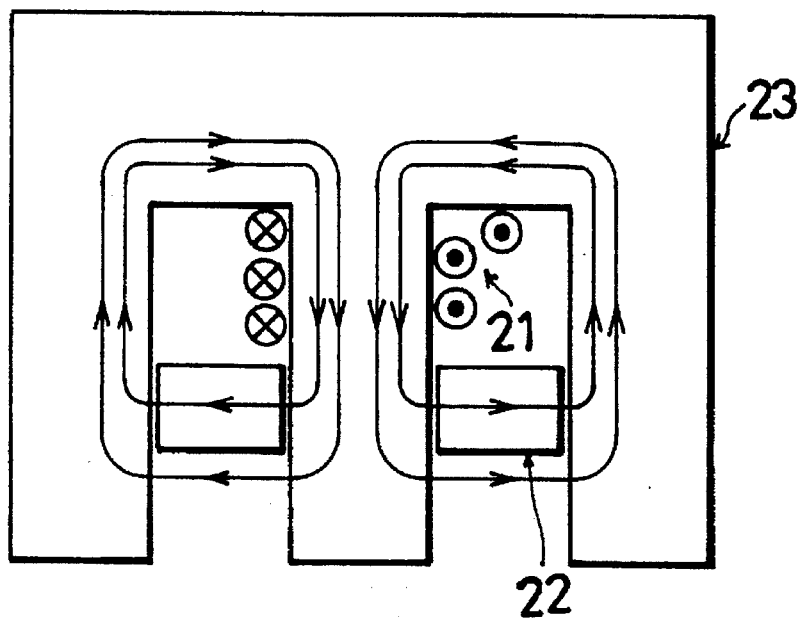
FIG. 7 is a diagram corresponding to FIG. 4 and showing a comparative arrangement of cores of the device.

Suppose the movable coil 24 is not used as shown in FIG. 7. The magnetic field set up by the primary coil 21 will then be reversed before reaching the two straight portions 33 and will not reach these portions 33. Thus the primary and secondary coils 21, 22 fail to effect efficient magnetic induction.

The electromotive force generated in the secondary coil 22 flows through the heating coil 18, whereby a magnetic field is set up around the coil 18. The aluminum foil layer of the tube T present between the sealing jaws 14 is induction-heated by the resulting magnetic field. The heat of the aluminum foil layer melts the polyethylene layers outside thereof, and the tube T is heat-sealed at the same time transversely thereof under the pressure of the pressing means acting on the sealing jaws 14.

Figure 5:
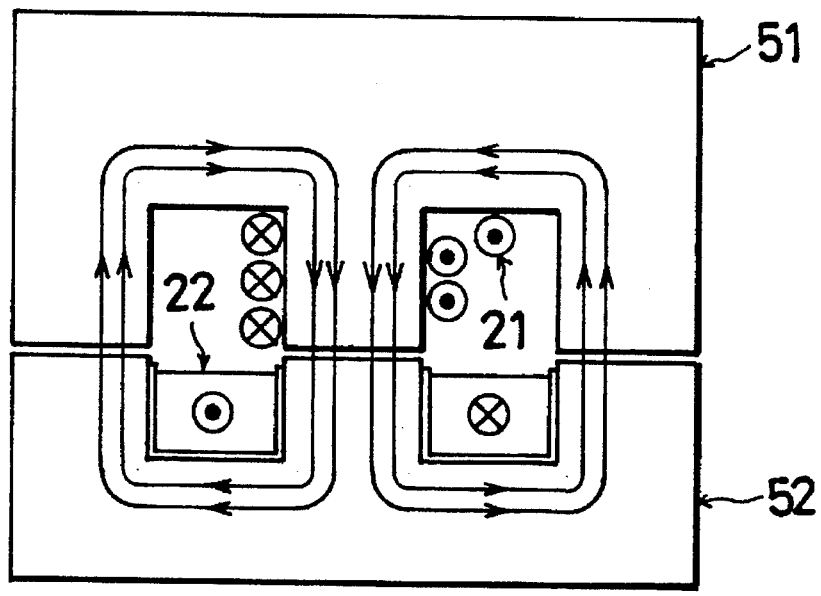
FIG. 5 is a diagram corresponding to FIG. 4 and showing modified cores of the sealing device.

FIG. 5 shows modified fixed core 51 and movable core 52. With this modification, the fixed core 51, as well as the movable core 52, is approximately E-shaped when seen from above. The fixed core 51 and the movable core 52 are united into a three-leg core, with the opening portions of one of the cores opposed to those of the other.

Figure 6:
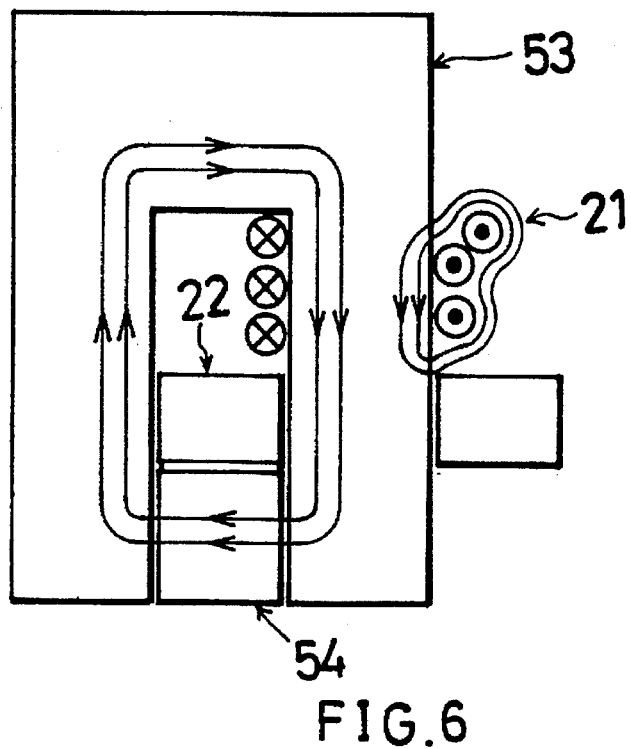
FIG. 6 is a diagram corresponding to FIG. 4 and showing other modified cores of the sealing device.

FIG. 6 shows other modified fixed core 53 and movable core 54. According to this modification, the fixed core 53 is approximately C-shaped when seen from above, and the movable core 54 is in the form of a bar. The fixed core 53 and the movable core 54, when united, provide a two-leg core.

Figure 8:
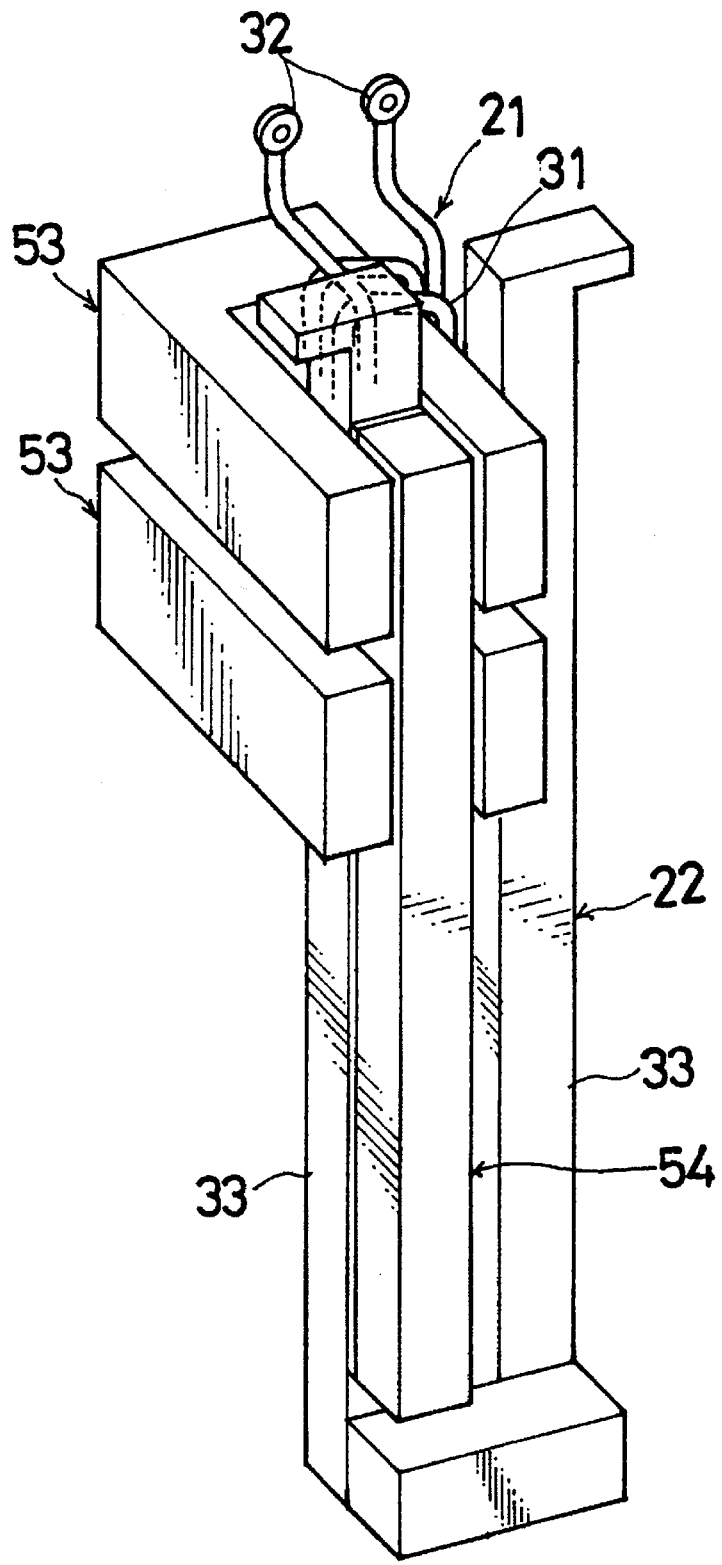
FIG. 8 is a perspective view corresponding to FIG. 3 and showing a modification including the cores of FIG. 6.

The two-leg core is more advantageous to use than the three-leg core in reducing the space needed but is slightly less efficient in electromagnetic induction. To compensate for this, the primary coil 21 and the fixed core 53 may be arranged at each of upper and lower two levels as shown in FIG. 8.

What is claimed is:

1. A sealing device for a vertical packaging material tube of laminate having an aluminum foil layer for sealing the tube (T) transversely thereof and comprising a lift frame (11), a pair of pressure arms (13) supported by the lift frame (11) each at a lower portion thereof and pivotally movable about respective parallel horizontal axes, a pair of sealing jaws (14) opposed to each other and fixed to the respective pressure arms (13) each at an upper portion of the arm, drive means for lowering and pivotally moving the pressure arm (13) for opening the sealing jaws (14) when the lift frame (11) is raised, and a high-frequency heating coil (18) on one of the sealing jaws (14) when the lift frame (11) is lowered and said drive means for raising and closing the sealing jaws (14) when the lift frame (11) is lowered, and a high frequency heating coil (18) on one of the sealing jaws (14) for induction-heating the aluminum foil later of the tube present between the sealing jaws (14) as said sealing jaws are closed, the sealing device being characterized in that the device has a transmission-side primary coil (21) fixedly disposed at one side of the path of vertical movement of the lift frame (11) and a receiving-side secondary coil (22) for forming a closed electrical circuit along with the heating coil (18), when said lift frame is lowered and said sealing jaws are closed, the primary coil (21) and the secondary coil (22) being electromagnetically connected when the sealing jaws (14) are closed, the primary coil (21) and the secondary coil (22) being electromechanically separated when said lift frame is raised and said jaws (14) are opened.

2. A sealing device for a vertical packaging material tube having an aluminum foil layer which device is adapted to seal the tube (T) transversely thereof and comprising a lift frame (11), a pair of pressure arms (13) supported by the lift frame (11) each at a lower portion thereof and pivotally movable about respective parallel horizontal axes, a pair of sealing jaws (14) opposed to each other and fixed to the respective pressure arms (13) each at an upper portion of the arm, drive means for lowering and pivotally moving the pressure arm (13) for opening the sealing jaws (14) when the lift frame (11) is lowered and for raising and closing the sealing the sealing jaws (14) when the lift frame (11) is raised, and a high-frequency heating coil (18) on one of the sealing jaws (14) as said sealing jaws are closed, the sealing device being characterized in that the device has a transmission-side primary coil (21) fixedly disposed at one side of the path of vertical movement of the lift frame (11) and a receiving-side secondary coil (22) for forming a closed electrical circuit along with the heating coil (18), when said lift frame is raised and said sealing jaws are closed, the primary coil (21) and the secondary coil (22) being electromagnetically connected when the sealing jaws (14) are closed, the primary coil (21) and the secondary coil (22) being electromechanically separated when said left frame is lowered and said jaws (14) are opened, the primary coil (21) having a horizontal helical portion (31) extending in a direction orthogonal to the axis about which the pressure arm (13) is pivotally movable, and the secondary coil (22) having a pair of straight portions (33) vertically extending respectively at opposite sides of the axis of the helical portion (31), the straight portion (33) being moved toward and away from an end of the helical portion (31) with the pivotal movement of the pressure arms (31).

3. A sealing device for a packaging material tube as defined in claim 2 wherein the helical portion (31) has a fixed core (23), and the straight portions (33) have a movable core (24) movable with the straight portion (33), the fixed core (23) and the movable core (24) being united when the sealing jaws (14) are closed and forming a closed magnetic circuit extending inside the helical portion (31) and between the straight portions (33).

4. A sealing device for a packaging material tube as defined in claim 3 wherein the fixed core (23) is approximately E-shaped when seen from above and comprises a leg (41) having the helical portion (31) fitted therearound, a pair of outer legs (41) extending parallel to each other respectively at opposite sides of the leg (31), and a yoke (43) connecting corresponding ends of the legs (41) and the outer legs (42), and the movable core (24) comprises bars extending along the respective straight portions (33) and fixed to the straight portion (33).

5. A sealing device for a packaging material tube as defined in claim 3 wherein the fixed core (51) and movable core (52) are each approximately E-shaped when seen from above and have their opening portions opposed to each other.

6. A sealing device for a packaging material tube as defined in claim 3 wherein the fixed core (53) is approximately C-shaped when seen from above, and the movable core (54) is in the form of a bar.

7. A sealing device for a packaging material tube as defined in claim 6 wherein the primary coil (21) and the fixed core (53) are arranged at each of upper and lower two levels.

* * * * *